United States Patent
Horhammer et al.

(10) Patent No.: US 10,372,728 B2
(45) Date of Patent: Aug. 6, 2019

(54) SYSTEM AND METHOD PROVIDING A SCALABLE AND EFFICIENT SPACE FILLING CURVE APPROACH TO POINT CLOUD FEATURE GENERATION

(71) Applicant: ORACLE INTERNATIONAL CORPORATION, Redwood Shores, CA (US)

(72) Inventors: Michael Axel Ludwig Horhammer, Nashua, NH (US); Siva K. Ravada, Nashua, NH (US); Cheng-Hua Wang, Bedford, NH (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 323 days.

(21) Appl. No.: 15/267,275

(22) Filed: Sep. 16, 2016

(65) Prior Publication Data

US 2018/0081995 A1 Mar. 22, 2018

(51) Int. Cl.
*G06F 17/50* (2006.01)
*G06F 16/28* (2019.01)

(52) U.S. Cl.
CPC .................................. *G06F 16/283* (2019.01)

(58) Field of Classification Search
CPC .......................... G06F 17/30592; G06F 16/283
USPC ........................................................ 703/2, 1
See application file for complete search history.

(56) References Cited

U.S. PATENT DOCUMENTS 6,460,026 B1 * 10/2002 Pasumansky ..... G06F 17/30592
707/737

8,159,493 B2 * 4/2012 Lecerf .................. G06T 11/203
345/440

OTHER PUBLICATIONS

QuantimGIS; downloaded on Aug. 29, 2016 from: https://github.com/ccrook/QGIS-Contour-Plugin; 1 page.
Voronoi Diagram; Downloaded on Aug. 29, 2016 from: https://en.wikipedia.org/wiki/Voronoi_diagram, pp. 1-4.
How to Create Contours from XY Data Using 3D Analyst; downloaded on Aug. 29, 2016 from: http://support.esri.com/fr/knowledgebase/techarticles/detail/25976, pp. 1-2.
Interpolating Point Data; downloaded on Aug. 29, 2016 from: http://www.qgistutorials.com/en/docs/interpolating_point_data.html, pp. 1-9.

(Continued)

*Primary Examiner* — Hugh M Jones
(74) *Attorney, Agent, or Firm* — Kraguljac Law Grouo, LLC

(57) ABSTRACT

Systems, methods, and other embodiments are disclosed for identifying features within point cloud data. In one embodiment, point cloud data is read which represents multiple points of at least one point cloud in a multi-dimensional space. Each point in the point cloud data is defined by an attribute value quantifying an attribute of the point and a set of coordinates specifying a location of the point in the multi-dimensional space. The set of coordinates for each point is transformed into a space-filling distance value representing a distance along a space-filling curve. The points are sorted according to the space-filling distance values to generate a sorted order of the points. The points are traversed in the sorted order and output data points are derived, while traversing the points, based on a specified feature criterion. The output data points identify a feature within the at least one point cloud.

19 Claims, 9 Drawing Sheets

(56) References Cited

OTHER PUBLICATIONS

Lidar; downloaded on Aug. 29, 2016 from: https://en.wikipedia.org/wiki/Lidar, pp. 1-6.
Hilbert Curve; downloaded on Aug. 29, 2016 from: https://en.wikipedia.org/wiki/Hilbert_curve, pp. 1-2.
Radial Sweep; downloaded on Aug. 29, 2016 from: http://www.imageprocessingplace.com/downloads_V3/root_downloads/tutorials/contour_tracing_Abeer_George_Ghuneim/ray.html, p. 1.
Marching Cubes; downloaded on Aug. 29, 2016 from: https://en.wikipedia.org/wiki/Marching_cubes; pp. 1-2.
Marching Tetrahedra; downloaded on Aug. 29, 2016 from: https://en.wikipedia.org/wiki/Marching_tetrahedra; p. 1.
Dividing Cubes Algorithm; downloaded on Aug. 29, 2016 from: http://www.csee.umbc.edu/~ebert/693/THu/dividingcubes.html; pp. 1-3.
Digital Elevation Model; downloaded on Aug. 29, 2016 from: https://en.wikipedia.org/wiki/Digital_elevation_model; pp. 1-3.
Triangulated Irregular Network; downloaded on Aug. 29, 2016 from: https://en.wikipedia.org/wiki/Triangulated_irregular_network; p. 1.
Marching Squares; downloaded on Aug. 29, 2016 from: https://en.wikipedia.org/wiki/Marching_squares, pp. 1-4.

\* cited by examiner

Example of a Point Cloud in 3D Space

PRIOR ART

Hilbert Curve 2D Transformation Program Code

410
```
//convert (x, y) to h
int xy-to-h (int n, int x, int y) {
    int rotx, roty, q, h=0;
    for (q=n/2; q>0; q/=2) {
        rotx = (x & q) > 0;
        roty = (y & q) > 0;
        h += q * q * ((3 * rotx) ^ roty);
        rotate(q, &x, &y, rotx, roty);
    }
    return h;
}
```

420
```
//convert h to (x, y)
void h-to-xy (int n, int h, int *x, int *y) {
    int rotx, roty, q, j=h;
    *x = *y = 0;
    for (q=1; q<n; q*/=2) {
        rotx = 1 & (j/2);
        roty = 1 & (j ^ rotx);
        rotate(q, x, y, rotx, roty);
        *x += q * rotx;
        *y += q * roty;
        j /= 4;
    }
}
```

430
```
//rotate a quadrant
void rotate (
    int n,
    int *x,
    int *y,
    int rotx,
    int roty) {
    if (roty == 0) {
        if (rotx == 1) {
            *x = n-1 - *x;
            *y = n-1 - *y;
        }
        //exchange x and y
        int j = *x;
        *x = *y;
        *y = j;
    }
}
```

FIG. 4

Example Related to Two Intersecting Point Clouds

US 10,372,728 B2

SYSTEM AND METHOD PROVIDING A SCALABLE AND EFFICIENT SPACE FILLING CURVE APPROACH TO POINT CLOUD FEATURE GENERATION

BACKGROUND

Point cloud data is sampled data representing some feature, object, or element in a multi-dimensional space. A point cloud is usually a very large point set of point cloud data represented in two-dimensional or three-dimensional space, or two and a half dimensional (2.5D) space. The position of each point in the point cloud is defined by a set of coordinates and each point may be assigned an attribute value such as, for example, an intensity value. An iso-line is a line or curve, through a set of data points, made up of points each representing a same attribute value. For example, an iso-line may be generated through a two-dimensional point cloud representing an elevation attribute, where the iso-line is a contour line representing a fixed elevation (e.g., one-hundred (100) meters). Various methods have been used to generate or identify iso-lines through a set of data.

Iso-lines can be generated as derived products from digital elevation model (DEM) data, triangulated irregular network (TIN) data or, less commonly, from point cloud data. A DEM represents elevation in the form of a regular grid or raster (e.g., see https://en.wikipedia.org/wiki/Digital_elevation_model), and a TIN represents elevation in the form of irregularly shaped triangles forming a mesh (e.g., see https://en.wikipedia.org/wikifTriangulated_irregular_network). Digital elevation models conveniently lend themselves to the popular "Marching Squares" approach of generating contour lines, due to the inherent raster representation. The Marching Squares approach requires rasterized data (e.g., see https://en.wikipedia.org/wiki/Marching_squares). Non-uniform data cannot be rasterized without losing accuracy and/or yielding empty or interpolated grid cells. The Marching Squares approach also requires significant run time main memory for the raster.

Performing the Marching Squares approach using smaller partitions requires less memory, however, at the significant expense of efficiency. Triangulated irregular networks allow direct generation of line string segments, from individual triangles, based on linear interpolation between two pairs of three corner vertices (if any of the three vertices are on opposing sides of the respective contour elevation). A DEM can be logically derived from a point cloud based on rasterization, but may yield "empty" raster cells or require some form of interpolation to fill the cells. Also, with point clouds having non-uniform density, detail is sacrificed in some areas and holes or estimates are formed in other areas. Therefore, there is a tradeoff in the configurable grid density when using a rasterization methodology.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 4 graphically illustrates an example embodiment of programming code for transforming between coordinates of a two-dimensional space and space-filling distance values for a space-filling curve;

DETAILED DESCRIPTION

Figure 1:
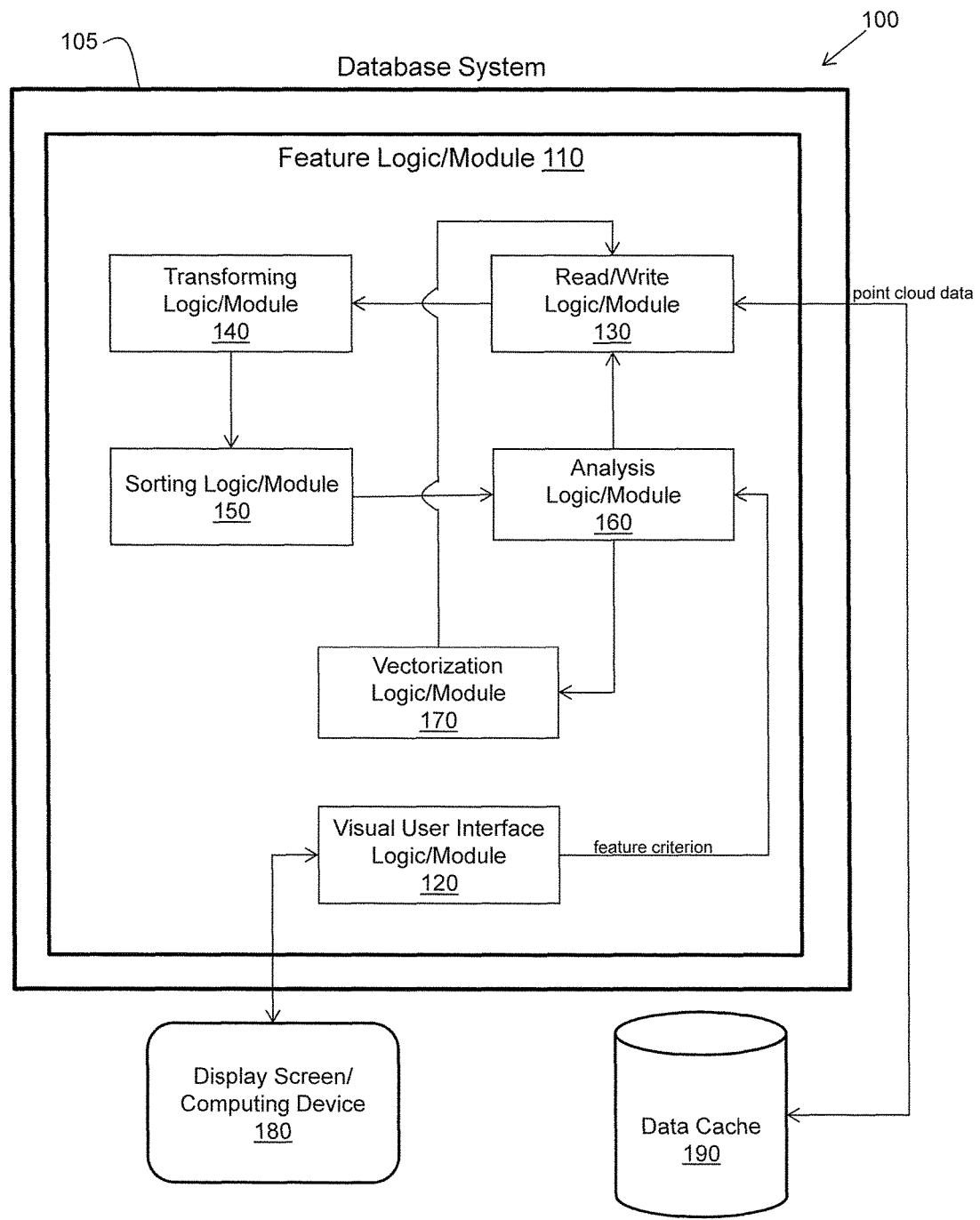
FIG. 1 illustrates one embodiment of a database system, having a computing device configured with feature logic, for determining features (e.g., iso-features) within a set of point cloud data.

Computerized systems, methods, and other computerized embodiments are disclosed that provide a scalable and efficient space-filling curve functionality within a database system for identifying features within a set of point cloud data. Point cloud data is sampled data representing some feature, object, or element in a multi-dimensional space. For example, point cloud data may be generated by sampling one or more attributes of a real-world object in a multi-dimensional space (e.g., a laser radar sampling the elevation of a mountain range). A feature may be, for example, a line, a curve, or a surface made up of data points each having a same attribute value (e.g., a constant elevation contour). A feature may alternatively be points of a point cloud on a planar cross-section through the point cloud, or the intersection of points from two or more point clouds. A space-filling curve is used to generate features directly from a point cloud without involving rasterization (gridding) of a multi-dimensional space. The approach is fast and main-memory-efficient and also adapts naturally to greatly varying data densities between regions.

The use of a space-filling curve converts the problem of finding features within a set of point cloud data from a multi-dimensional problem (e.g., 2D or 3D) to a single dimensional problem (1D), allowing efficient use of processing resources. In one embodiment, coordinates of points of a point cloud in a multi-dimensional space are converted to Hilbert distance values representing distances along a single dimensional Hilbert curve. The Hilbert curve is traversed, possibly many times, via the processing capability of the database system to find boundaries and/or intersections that represent one or more features. Information on Hilbert curves can be found, for example, at https://en.wikipedia.org/wiki/Hilbert_curve.

The following terms are used herein with respect to various embodiments.

The term "point cloud", as used herein refers to a usually very large point set of data in a multi-dimensional space as represented in a computer system, where each point in the point set is represented by an attribute value quantifying an attribute of the point and a set of coordinates specifying a location or position of the point in the multi-dimensional space. Again, point cloud data may be sampled data representing some feature or element in the multi-dimensional space.

The term "feature", as used herein, may refer to a line, a curve, or a surface through a point cloud made up of data points each having a same attribute value (e.g., a constant elevation contour) and is derived from a set of point cloud data of the point cloud as represented in a computer system. The term "feature", as used herein, may also refer to a cross-section through a point cloud made up of data points in a same plane in a multi-dimensional space and is derived from a set of point cloud data of the point cloud as represented in a computer system. The term "feature", as used herein, may further refer to an intersection of two point clouds where pairs of data points have a same (or nearly the same) location in a multi-dimensional space as represented in a computer system. Other types of features may be possible as well (e.g., the intersection of three point clouds).

Figure 5:
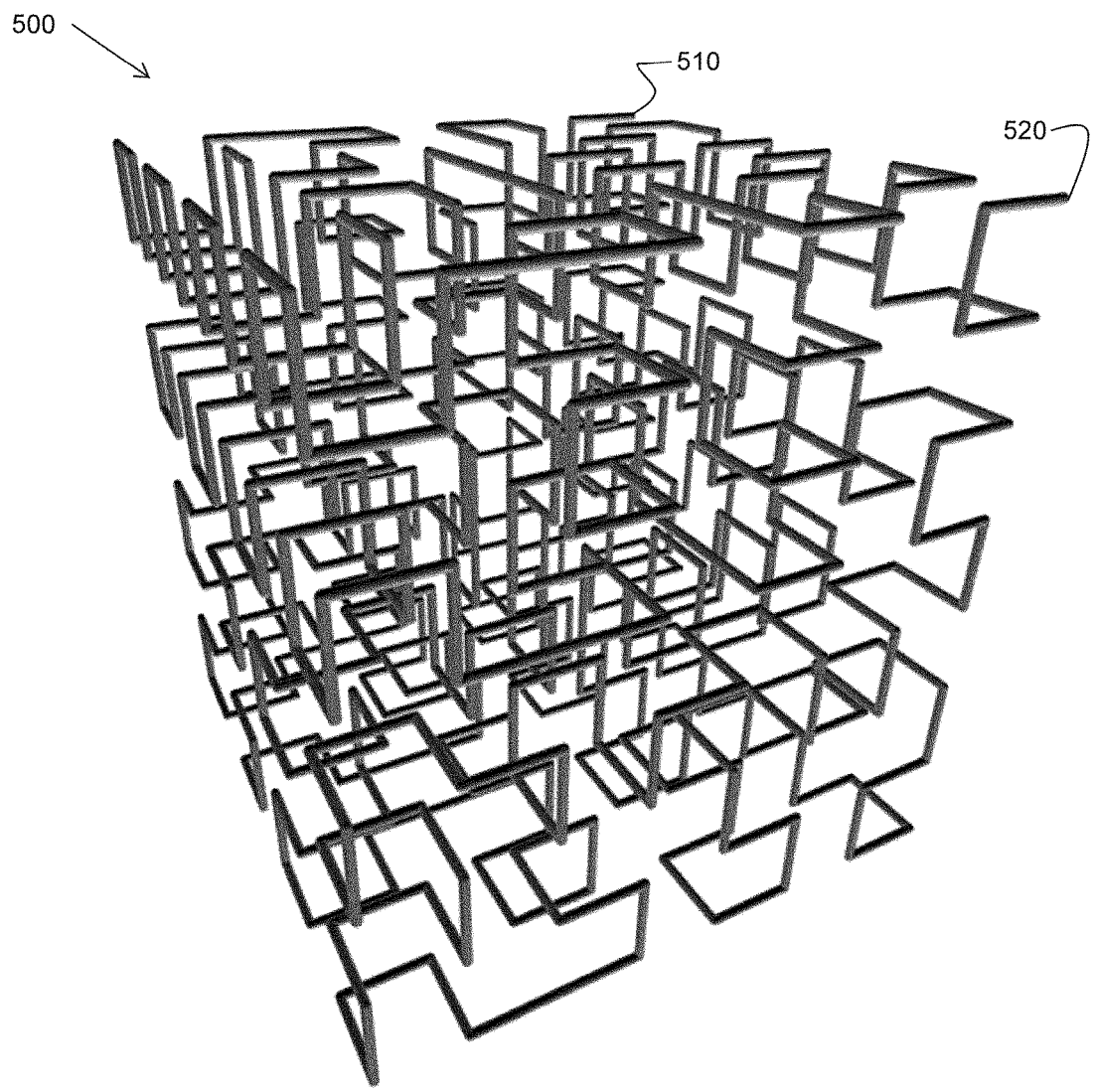
FIG. 5 graphically illustrates an embodiment of a single dimensional space-filling curve filling a three-dimensional space.

The term "space-filling curve", as used herein, refers to a single-dimensional, non-self-intersecting line completely filling a multi-dimensional space as represented in a computer system (e.g., see FIG. 5). A space-filling curve is a way of showing how points in a multi-dimensional space map to distance values along a single-dimensional line.

The term "space-filling distance value", as used herein, refers to a numerical value representing a distance along a space-filling curve as represented in a computer system.

The term "feature criterion", as used herein, refers to a boundary condition that may be met while traversing a multi-dimensional space along a space-filling curve as represented in a computer system.

Overview

A space-filling curve is used to generate features directly from a point cloud of data represented in a computer system. For example, 2D and 3D boundary geometries can be generated between temperature boundaries, pressure boundaries, elevation boundaries, cross-sections, and intersections. The approach does not involve rasterization (forming a grid pattern) as in many prior art applications. Furthermore, the approach is fast, is main-memory efficient, and adapts naturally to greatly varying densities (non-uniform data) between regions within a multi-dimensional space. The approach described herein readily scales from very small data sets to very large data sets. Avoiding rasterization results in high quality results and main-memory efficiency.

The data points making up a point cloud in a multi-dimensional space are read and transformed to points on a space-filling curve, in accordance with the approach. Each point in the point cloud is represented by a set of coordinates and an attribute value (or a functionally derived value). For example, in one embodiment, a set of coordinates (e.g., x, y, z coordinates in a 3D space) are transformed to a Hilbert distance value on a Hilbert curve (a space-filling curve) for each point in a point cloud. The points are sorted in accordance with the Hilbert distance values to form a sorted order of points along the Hilbert curve which is a single dimensional space-filling curve that, if plotted within the multi-dimensional space, would fill the multi-dimensional space as represented in the computer system. The sorted order of points may be stored in a Hilbert-sorted point list. Graphical examples of Hilbert curves are provided later herein.

Thus, the points of the point cloud are transformed from a multi-dimensional representation (e.g., in 3D space) to a single dimensional representation along a Hilbert curve as represented, for example, in a data structure (e.g., a Hilbert-sorted point list). The attribute value of each point is maintained in the Hilbert representation. The single dimensional representation is much easier to process in the computer system, than the multi-dimensional representation, to find features within the point cloud. Please note that the Hilbert-sorted point list does not necessarily store the Hilbert value itself but instead may store (x, y, z) and other attributes. The sorting is based on Hilbert, but the actual Hilbert value, in some embodiments, may not be stored, and may not subsequently be regenerated. In such embodiments, the Hilbert value is just initially used for sorting.

In accordance with one embodiment, the sorted points of the point cloud are traversed in Hilbert distance value order. When traversing between any current point and a next point along the Hilbert curve, a determination is made as to whether an attribute boundary is crossed. For example, the attribute may represent elevation of a terrain represented by the point cloud, and the attribute boundary may be specified as being 100 meters. If a current point has an elevation of 90 meters and the next point along the Hilbert curve has an elevation of 120 meters, then the attribute boundary of 100 meters is crossed when traversing from the current point to the next point.

In one embodiment, a linear interpolation is made between the attribute values (90 meters and 120 meters) of the two points to generate an interpolated data point (an output data point). The interpolated data point is assigned an attribute value of 100 meters (the attribute boundary value) and is located at a Hilbert distance that spans from the beginning of the Hilbert curve to one-third ($\frac{1}{3}$) of the distance between the current point and the next point (i.e., (100−90)/(120−90)=$\frac{1}{3}$ based on the attribute values). The Hilbert distance value of the interpolated point can be converted back to a set of coordinates in the multi-dimensional space (e.g., x, y, z in 3D space). In another embodiment, the linear interpolation is made along the straight-line distance between the two points in the point cloud such that conversion between the Hilbert space and the multi-dimensional space is not necessary.

The interpolated data point becomes a point on a feature (e.g., an iso-surface in 3D space) representing a 100 meter elevation feature. As the Hilbert curve is traversed, other interpolated data points along the 100 meter feature may be found as well, until a complete 100 meter elevation feature (e.g., a 100 meter iso-surface in 3D space) is formed as represented in the computer system. The feature may be rendered as an image, along with the point cloud, and displayed to a user, in accordance with one embodiment. However, rendering and displaying of features and point clouds as images is beyond the scope of the subject matter that is discussed herein.

Depending in part on the multi-dimensional space of the point cloud, the feature can be an iso-line, an iso-surface, a planar cross-section, or an intersection of the point cloud with another point cloud in the same multi-dimensional space. Furthermore, depending on the nature of the point cloud data, the attribute of the points may be elevation (e.g., of terrain data), intensity (e.g., of medical imaging data from tissue), color (e.g., of spectral data from stars), density (e.g., of medical imaging data from bone), temperature (e.g., of thermal data from the atmosphere), or number-of-occurrences (e.g., of influenza data from across the country). Many other types of attributes are possible as well.

In this manner, a multi-dimensional problem can be transformed into a single dimensional problem that allows features within point clouds to be readily determined without taxing the processing and main-memory capacities of a database system. Furthermore, the approach does not have to be altered when the size, scale, density, uniformity, or dimensional space of the point cloud data changes.

Detailed Description with Respect to the Drawings

FIG. 1 illustrates one embodiment of a database system 100, having a computing device 105 configured with feature logic 110, for generating features directly from a point cloud of data. Point cloud data may be represented as records or other data structures stored in the database system 100. In one embodiment, feature logic 110 may be part of a larger computer application (e.g., a computerized database application), configured to identify features within a set of point cloud data. Feature logic 110 is configured to computerize the process of finding features within point cloud data by converting a multi-dimensional scenario to a single dimensional scenario.

In one embodiment, the system 100 is a computing/data processing system including an application or collection of distributed applications for enterprise organizations. The applications and computing system 100 may be configured to operate with or be implemented as a cloud-based networking system, a Software as a Service (SaaS) architecture, or other type of computing solution.

With reference to FIG. 1, in one embodiment, feature logic/module 110 is implemented on the computing device 105 and includes logics or modules for implementing and controlling various functional aspects of feature logic/module 110. In one embodiment, feature logic/module 110 includes visual user interface logic/module 120, read/write logic/module 130, transforming logic/module 140, sorting logic/module 150, analysis logic/module 160, and vectorization logic/module 170.

Other embodiments may provide different logics or combinations of logics that provide the same or similar functionality, and control of that functionality, as feature logic 110 of FIG. 1. In one embodiment, feature logic 110 is an executable application including program modules configured to perform the functions of the logics. The application is stored in a non-transitory computer storage medium. That is, in one embodiment, the logics of feature logic 110 are implemented as modules of instructions stored on a computer-readable medium.

The database system 100 also includes a display screen 180 operably connected to the computing device 105. In accordance with one embodiment, the display screen 180 is implemented to display views of and facilitate user interaction with a graphical user interface (GUI) generated by visual user interface logic 120. The graphical user interface may be used, for example, for controlling user specification of at least one specified feature criterion, as discussed later herein. The graphical user interface may be associated with a feature program and visual user interface logic 120 may be configured to generate the graphical user interface.

In one embodiment, the database system 100 is a centralized server-side application that provides at least the functions disclosed herein and that is accessed by many users via computing devices/terminals communicating with the database system 100 (functioning as the server) over a computer network. Thus the display screen 180 may represent multiple computing devices/terminals that allow users (e.g., data analysts) to access and receive services from feature logic 110 via networked computer communications.

Figure 2:
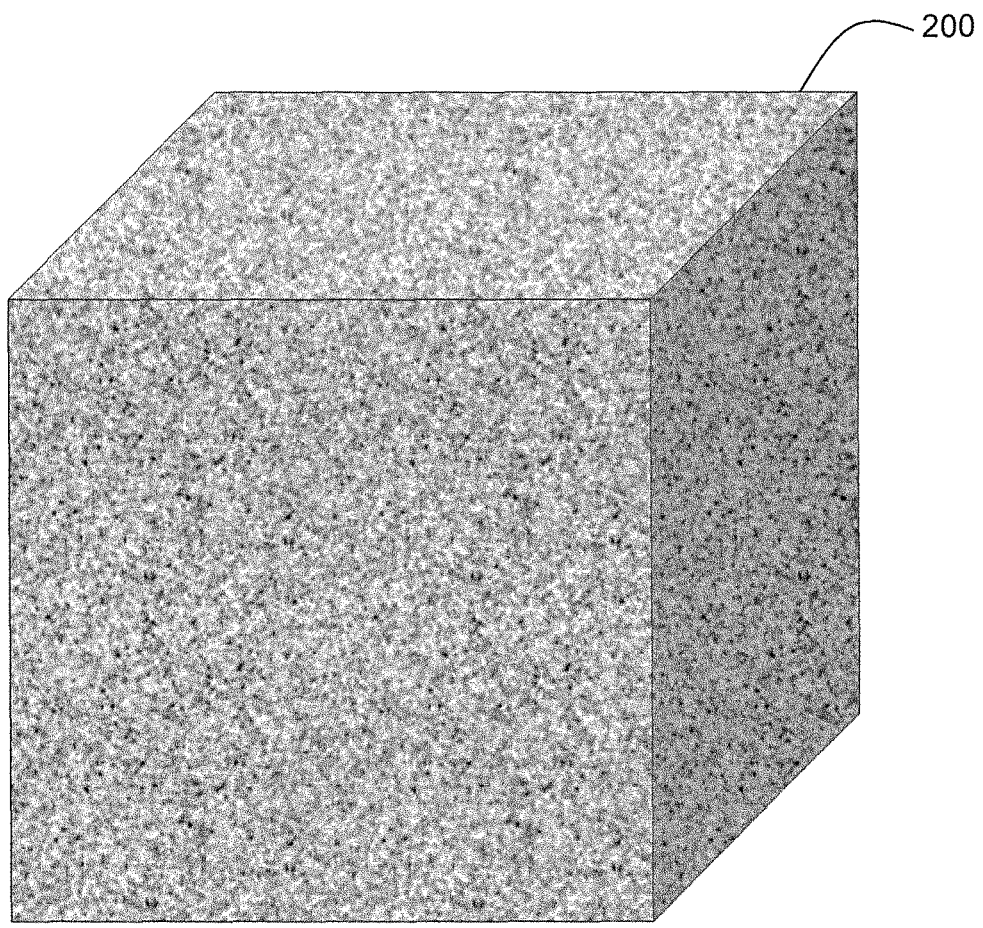
FIG. 2 graphically illustrates an example embodiment of a point cloud that may be represented in a three-dimensional space.

In one embodiment, the database system 100 further includes data cache 190 operably connected to the computing device 105 and/or a network interface to access the data cache 190 via a network connection. In accordance with one embodiment, the data cache 190 is configured to store sets of point cloud data. The data cache 190 may also store, for example, resultant feature data (output data). FIG. 2 graphically illustrates an example embodiment of a point cloud that may be represented in a three-dimensional space (x, y, z). The points in the point cloud of FIG. 2 may be associated with an intensity attribute representing intensity levels of laser energy collected by a light detection and ranging (Lidar) system over a portion of a city, for example.

Referring back to the logics of feature logic 110 of FIG. 1, in one embodiment, visual user interface logic 120 is configured to generate a graphical user interface (GUI) to facilitate user interaction with feature logic 110. For example, visual user interface logic 120 includes program code that generates and causes the graphical user interface to be displayed based on an implemented graphical design of the interface. In response to user actions and selections via the GUI, associated aspects of feature logic 110 may be manipulated. In one embodiment, visual user interface logic 120 is configured to facilitate user specification of one or more feature criteria as discussed in more detail later herein.

Referring again to FIG. 1, in one embodiment, the data cache 190 is configured to store records of point cloud data. The records of point cloud data represent multiple points of a point cloud in a multi-dimensional space. Each point of the multiple points is defined by an attribute value of the point cloud data quantifying an attribute of the point, and a set of coordinates of the point cloud data specifying a location or position of the point in the multi-dimensional space. An attribute may correspond to an intensity, an elevation, a color, a density, a temperature, a number-of-occurrences (e.g., of influenza cases), or a return number (e.g., from multiple laser reflections), for example. Other types of attributes are possible as well. A set of coordinates may corresponds to (x, y) coordinates in a two-dimensional space, or (x, y, z) coordinates in a three-dimensional space. Other sets of coordinates in other types of multi-dimensional spaces are possible as well, in accordance with various embodiments.

In one embodiment, read/write logic 130 is configured to read the records of the point cloud data from the data cache. Attribute values and coordinates of each point represented by the point cloud data are read by read/write logic 130. Other characteristics associated with the points represented by the point cloud data may be read as well. For example, in addition to attribute values and coordinates, the points may also be associated with separate identifiers which further distinguish one point from another, in accordance with one embodiment.

In one embodiment, transforming logic 140 is configured to transform the set of coordinates for each point of the multiple points of the point cloud into a space-filling distance value representing a distance along a single dimensional space-filling curve. The single dimensional space-filling curve is a Hilbert curve, in accordance with one embodiment, and the space-filling distance value for each point is a Hilbert value. Information on Hilbert curves can be found at, for example, https://en.wikipedia.org/wiki/Hilbert_curve. Other types of space-filling curves are possible as well and include, for example, Peano, Gray, Sweep, and Scan curves. Sets of two-dimensional coordinates (e.g., x, y coordinates, or 2.5D if a z value exits) may be transformed into space-filling distance values along a space-filling curve that fills a two-dimensional space as represented in the database system. Again, a space filling distance value refers to a numerical value representing a distance along a space-filling curve as represented in a computer system. Sets of three-dimensional coordinates (e.g., x, y, z coordinates) may be transformed into space-filling distance values along a space-filling curve that fills a three-dimensional space as represented in the database system. Larger dimensions may be accommodated as well by other space-filling curves. In accordance with one embodiment, a space-filling curve can have an order "n", where the order "n" determines a density of the space-filling curve with respect to a multi-dimensional space. In general, the larger the order "n", the denser the space-filling curve.

Figure 3:
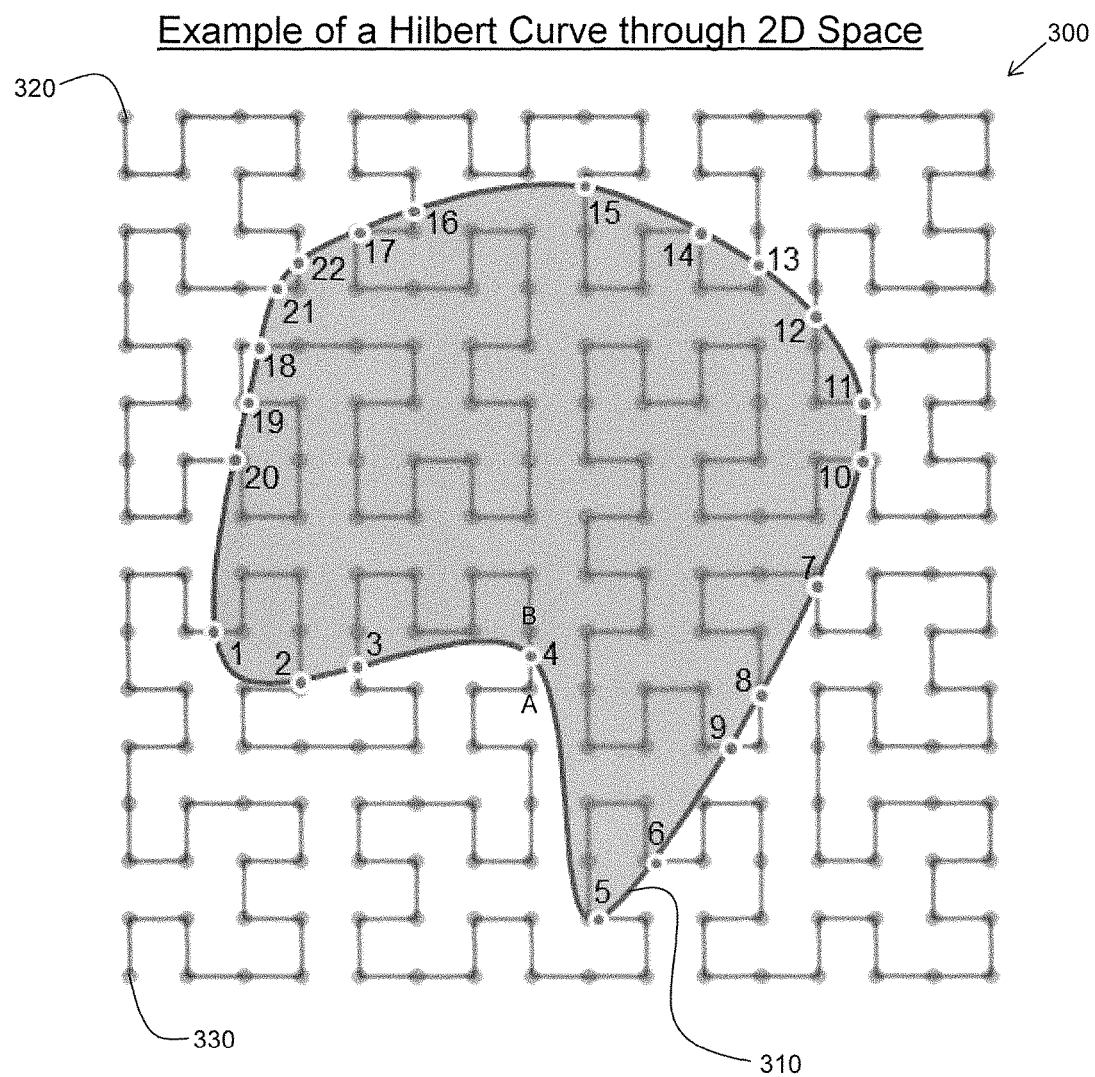
FIG. 3 graphically illustrates an example embodiment of a single dimensional space-filling curve filling a two-dimensional space, along with an iso-line determined using the database system of FIG. 1.

FIG. 3 graphically illustrates an example embodiment of a single dimensional space-filling curve 300 filling a two-dimensional space, along with an iso-line 310 determined using the database system 100 of FIG. 1. The space-filling curve 300 is a Hilbert curve that begins in the upper left corner at point 320, ends in the lower left corner at point 330, and is continuous in between. Each non-numbered point (dot) on the Hilbert curve 300 represents a point from a two-dimensional point cloud represented at a Hilbert distance from the beginning of the Hilbert curve 300. That is, the set of coordinates (x, y) for each point in the point cloud has been transformed into a Hilbert distance value "h" representing a distance along the single dimensional Hilbert curve 300. The points on the Hilbert curve representing points in the point cloud only coincidentally lie on a grid since such a data set was chosen for the example of FIG. 3. In general, the points can have any distribution.

For example, FIG. 4 graphically illustrates an example embodiment of equations (in C language programming code) for transforming between coordinates of a two-dimensional space and space-filling distance values for a Hilbert curve (e.g., see https://en.wikipedia.org/wiki/Hilbert_curve). A first code 410 is [//convert (x, y) to h] which is configured to convert two-dimensional coordinates "(x, y)" of a point in a two-dimensional point cloud to a Hilbert distance value "h". A second code 420 is [//convert h to (x, y)] which is configured to convert a Hilbert distance value of "h" back to two-dimensional coordinates "(x, y)". A third code 430 is [//rotate a quadrant] which is used by the first code 410 and the second code 420 to aid in performing the respective conversions.

The programming codes of FIG. 4 assume a square that is divided into n by n cells where n is a power of two (2). The coordinates (0, 0) are at the lower left corner of the square, and the coordinates (n−1, n−1) are at the upper right corner of the square. A distance "h" begins at zero (0) in the lower left corner and goes to ($n^2$-1) in the lower right corner. In FIG. 4, the "&" symbol is a bitwise AND, the "^" symbol is a bitwise XOR, the "+=" operator adds on to a variable, and the "/=" operator divides a variable. In programming code 410, the variable "rotx" is set to zero (0) or one (1) to match bit q of x (as is similarly done for variable "roty").

Similarly, as another example, FIG. 5 graphically illustrates an embodiment of a single dimensional space-filling curve 500 filling a three-dimensional space. The space-filling curve 500 is a Hilbert curve that begins in the corner 510, ends in the corner 520, and is continuous in between. Each point (dot) on the Hilbert curve 500 represents a point from a three-dimensional point cloud represented at a Hilbert distance from the beginning of the Hilbert curve 500. That is, the set of coordinates (x, y, z) for each point in the point cloud has been transformed into a Hilbert distance value "h" representing a distance along the single dimensional Hilbert curve 500. Other, but similar, programming codes from that of FIG. 4, that accommodate three-dimensional transformations, may be used to convert between (x, y, z) coordinates and Hilbert distance values "h", and vice-versa.

In one embodiment, sorting logic 150 is configured to sort the multiple points in the point cloud according to the space-filling distance value of each point to generate a sorted order of multiple points. The sorted order of the multiple points, based on the space-filling values, represents where the points fall on the single dimensional space-filling curve within the multi-dimensional space in which the point cloud exists. The space-filling values of the sorted order of multiple points may be written to a data structure (e.g., a Hilbert-sorted point list) by sorting logic 150, in accordance with one embodiment.

In one embodiment, the data structure of the sorted order of multiple points is transferred to analysis logic 160. Analysis logic 160 is configured to traverse the sorted order of multiple points through the data structure and derive output data points during the traversing based on a specified feature criterion. The output data points identify at least one feature within the point cloud. In one embodiment, the output data points are interpolated data points derived from the attribute values of a subset of the points based on the specified feature criterion.

For example, FIG. 3 may represent points of a point cloud having elevation attributes in a two-dimensional space. A specified feature criterion may be an elevation boundary of 100 meters. If a current data point being traversed has an attribute elevation value of 90 meters and a next data point being traversed has an attribute elevation value of 110 meters, then the 100 meter boundary is crossed when traversing from the current point to the next point along the space-filling curve. Linear interpolation may be applied to generate an interpolated data point located between the current point and the next point along the space-filling curve.

The interpolated data point has a space-filling distance value and an elevation attribute value of 100 meters (i.e., the interpolated data point falls on the 100 meter boundary). The traversing and interpolating may continue to generate or identify additional points along the 100 meter boundary (i.e., the iso-line 310) in an iterative manner. As shown in FIG. 3, twenty-two (22) interpolated data points (1 to 22) have been found along iso-line 310 by analysis logic 160. In general, output (e.g., interpolated) data points identify at least one feature within a point cloud. In one embodiment, analysis logic 160 is configured to traverse the sorted order of multiple points through the data structure multiple times to find multiple features based on multiple specified feature criteria. However, the sorted order of multiple points only has to be generated once.

In one embodiment, analysis logic 160 is configured to convert the space-filling distance values of the output data points back to sets of coordinates in the multi-dimensional space. The output data points are then represented as sets of coordinates and attribute values (e.g., a constant attribute value of 100 meters) in a data structure, similar to how the points in the original point cloud are represented. For example, in one embodiment, the programming codes 420 and 430 are implemented as part of analysis logic 160 to convert space-filling distance values "h" of interpolated output data points back to sets of (x, y) coordinates in a two-dimensional space. However, in an alternative embodiment, once two points straddling a boundary in the Hilbert space are identified, the interpolation may be performed directly in the two-dimensional space of the point cloud. The interpolation is performed over a straight-line distance between the two points in the point cloud. In such an alternative embodiment, converting from the Hilbert space to the multi-dimensional (e.g., 2D) space is not necessary.

The data structure of output data points can be transferred to read/write logic 130 where, in one embodiment, read/write logic 130 is configured to write the data structure of output data points to the data cache 190. In another embodiment, read/write logic 130 is configured to output the data structure of output data points to a rendering logic (not shown) to render a graphical representation of the output data points (e.g., a 100 meter contour line or surface) within the multi-dimensional space. However, rendering is beyond the scope of the subject matter that is discussed herein.

Certain applications (e.g., rendering applications) may be configured to use features that are in a vector format. A vector format represents each output data point of a feature as a vertex, where the vertices of the output data points are connected in an ordered vector represented in at least one data structure. Furthermore, the vector format may accommodate multiple levels of detail (LOD), where each level of detail corresponds to a level of resolution along at least a portion of a feature. For example, a user may be able to "zoom-in" to view a higher level of detail (resolution), and "zoom-out" to view a lower level of detail (resolution). In one embodiment, vectorization logic 170 is configured to transform the output data points into such a vector format. A data structure of output data points in a vector format may be transferred to read/write logic 130 which is configured to write the data structure to the data cache 190, or to output the data structure to a rendering logic (not shown), for example.

In this manner, feature logic 110 of the database system 100 of FIG. 1 is able to find features within point clouds without having to use rasterization techniques. Furthermore, the approach described herein works equally well independent of the size, scale, density, uniformity, or dimensional space of the point cloud data. The approach converts the problem of finding features within a set of point cloud data from a multi-dimensional problem to a single dimensional problem, allowing efficient use of processing resources. As a result, the number of accesses to the database is reduced and sequentialized, the amount of network communications is reduced, processing time is reduced, and the computing resources are more available to other users.

Figure 6:
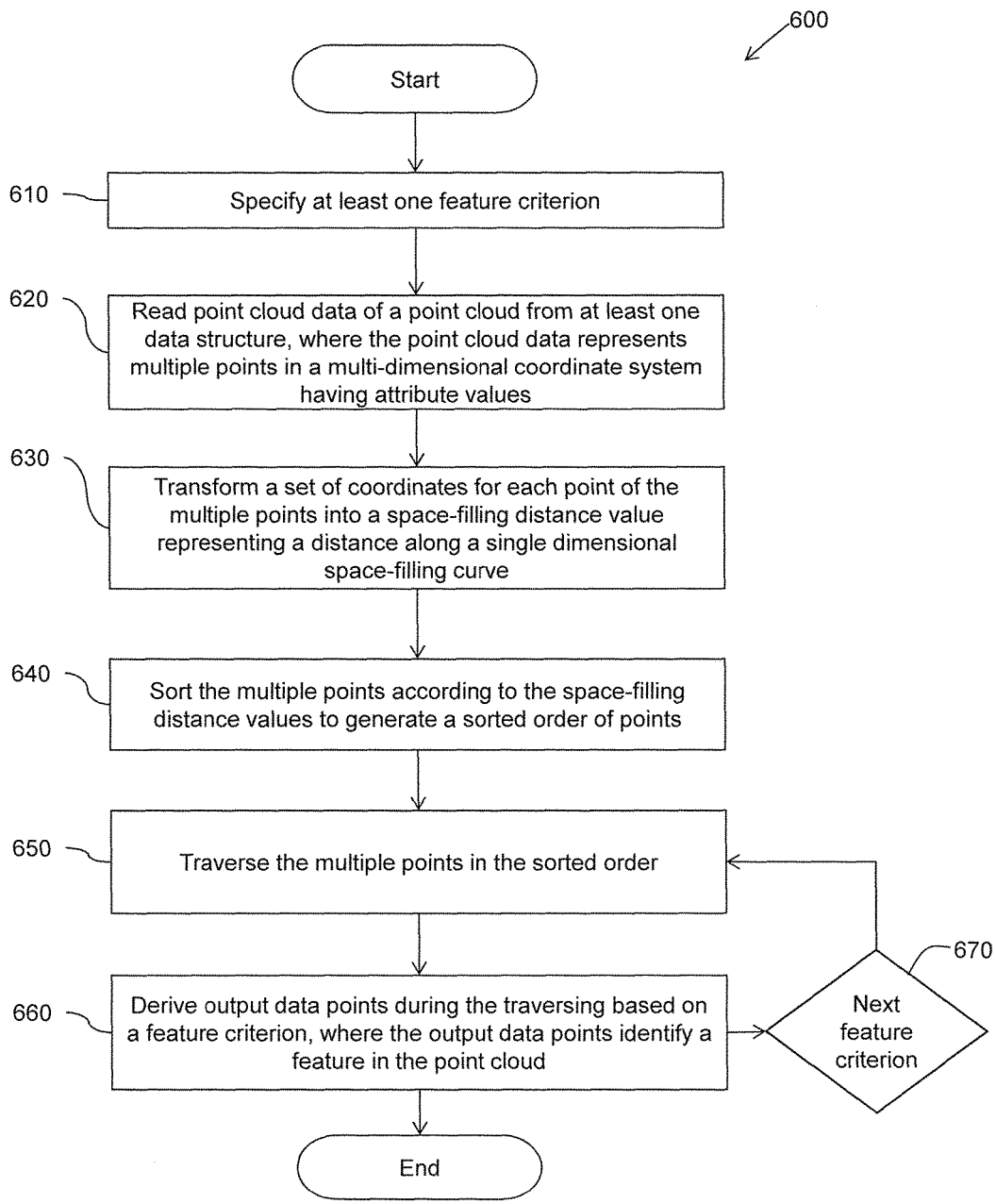
FIG. 6 illustrates one embodiment of a method, which can be performed by the feature logic of the database system of FIG. 1, to determine features within a set of point cloud data.

FIG. 6 illustrates one embodiment of a method 600, which can be performed by feature logic 110 of the database system 100 of FIG. 1, to determine features within a set of point cloud data. Method 600 describes operations of feature logic 110 and is implemented to be performed by feature logic 110 of FIG. 1, or by a computing device configured with a program code of the method 600. For example, in one embodiment, method 600 is implemented by a computing device configured to execute a computer application. The computer application is configured to process data in electronic form and includes stored executable instructions that perform the functions of method 600.

Method 600 will be described from the perspective that features within point cloud data can be determined using a same approach, independent of the size, scale, density, uniformity, or dimensional space of the point cloud data. The method converts the problem of finding features within a set of point cloud data from a multi-dimensional problem to a single dimensional problem, allowing efficient use of processing resources.

Upon initiating method 600, at block 610, at least one feature criterion is specified. In one embodiment, specification of a feature criterion is controlled through visual user interface logic 120 of feature logic 110 of FIG. 1. A user may interact with a graphical user interface of visual user interface logic 120 via the display screen 180 to facilitate specification of a feature criterion, for example. Again, a feature criterion is a boundary condition that may be met while traversing a multi-dimensional space along a space-filling curve as represented in a computer system. In another embodiment, specification of the feature criterion is controlled through an application program interface provided by feature logic 110.

In accordance with one embodiment, a feature criterion is the condition of crossing a specified attribute boundary value when traversing a multi-dimensional space along a space-filling curve, as was discussed herein with respect to FIG. 3. In another embodiment, a feature criterion is the condition of crossing a user-specified plane, specified within a multi-dimensional space, when traversing the multi-dimensional space along a space-filling curve (e.g., see FIG. 7 and the corresponding description herein).

Figure 8:
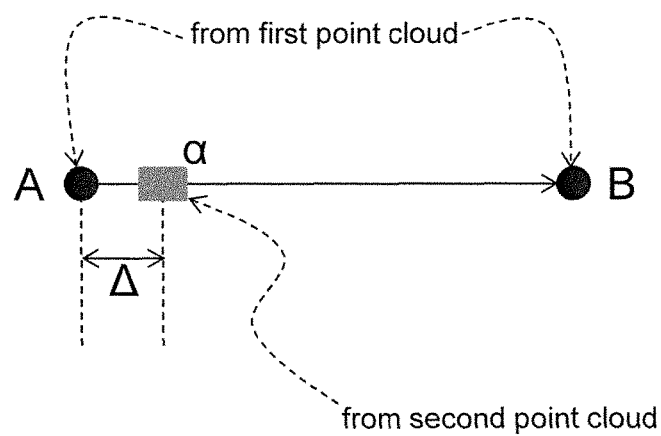
FIG. 8 illustrates an example embodiment of identifying the intersection of two point clouds using the database system of FIG. 1 and the method of FIG. 6.

In a further embodiment, a feature criterion is the condition of two point clouds intersecting each other within a multi-dimensional space (e.g., see FIG. 8 and the corresponding description herein). For example, an intersecting feature criterion may be the condition where a point in a first point cloud and a point in a second point cloud are found to be within a specified space-filling distance of each other when traversing a multi-dimensional space along a space-filling curve.

At block 620, point cloud data of a point cloud is read from at least one data structure (e.g., a data structure stored in data cache 190 of the database system 100 of FIG. 1). In one embodiment, the point cloud data is read by read/write logic 130 of feature logic 110 of FIG. 1. The point cloud data represents multiple points of the point cloud in a multi-dimensional space as represented in the database system 100. Each point of the multiple points is defined by an attribute value of the point cloud data quantifying an attribute (e.g., an elevation) of the point, and a set of coordinates (e.g., x, y) of the point cloud data specifying a location or position of the point in the multi-dimensional space (e.g., a two-dimensional space). A point cloud can be made up of thousands, millions, or even billions of points, for example, in accordance with various scenarios. The approach of identifying features described herein readily accommodates point clouds of greatly different sizes.

At block 630, the set of coordinates for each point of the multiple points in the point cloud is transformed into a space-filling distance value representing a distance along a single dimensional space-filling curve (e.g., a Hilbert curve). Such a transformation converts the problem of finding features within the point cloud from a multi-dimensional problem to a single dimensional problem within the database system 100. In one embodiment, transforming logic 140 of feature logic 110 of FIG. 1 performs the transformation. For example, in one embodiment, transforming logic 140 employs programming codes 410 and 430 of FIG. 4 to perform the transformation when the multi-dimensional space is a two-dimensional space. Even though the set of coordinates for each point is transformed to a space-filling distance value, the attribute value for each point can be maintained. In one embodiment, the space-filling distance values and attribute values for the points are maintained in a data structure.

At block 640, the multiple transformed points are sorted according to the space-filling distance values of the points to generate a sorted order of the points. That is, the multiple transformed points are sorted in numerical order and represent an order of points along a single dimensional space-filling curve that fills the multi-dimensional space. In this way, a representation of a space-filling curve does not have to actually be superimposed on a representation of a multi-dimensional space such that the space-filling curve actually traverses and fills the multi-dimensional space as represented in the database system. The sorted order of the points adequately represents the space-filling curve meandering through the multi-dimensional space for purposes of finding features. In one embodiment, sorting logic 150 performs the sorting of the points based on the space-filling distance values. Again, the attribute value for each point can be maintained and the sorted points may be maintained in a data structure.

At block 650, the multiple points are traversed in the sorted order (e.g., through a data structure). As the points are being traversed, at block 660, output data points are being derived based on a feature criterion. The output data points identify a feature within the point cloud. For example, in one embodiment, the output data points are interpolated data points. The interpolated data points are derived from the attribute values of some of the traversed points based on a feature criterion (i.e. when a feature criterion is met). The interpolated data points represent a feature within the point cloud. In one embodiment, analysis logic 160 of feature logic 110 of FIG. 1 is configured to traverse the points in sorted order and generate the interpolated data points corresponding to the feature.

Traversing the points in sorted order can be thought of as an iterative process where a first point and a second point are considered to determine if a boundary is crossed when going from the first point to the second point, then the second point and the third point are considered, and so forth. As each pair of the sorted points is considered, a specified feature criterion is checked to determine if the specified feature criterion has been met (i.e., that a boundary has been crossed between the two points under consideration). When it is determined that a feature criterion is met for two points under consideration, an output data point is derived. An output data point may be derived in one of several ways that may or may not include using interpolation.

As an example, referring again to FIG. 3, the dots along the Hilbert curve 300 represent the sorted points of a point cloud after transformation. The attribute value of each point corresponds to an elevation attribute. As the points are traversed in sorted order from point 320 to point 330, for every pair of points, a specified feature criterion is checked to see if it has been met. For example, the feature criterion may be the condition of crossing an elevation boundary of 100 meters when traversing from one point to another. If the elevation attribute value of point A in FIG. 3 is 80 meters and the elevation attribute value of point B in FIG. 3 is 120 meters, then the feature criterion is met when traversing from point A to point B. That is, the 100 meter boundary is crossed when traversing from point A to point B.

Therefore, the interpolated output data point number four (4) is generated as having an elevation attribute value of 100 meters and is located at a Hilbert distance value that is half-way between point A and point B based on linear interpolation between the 80 meter attribute value of point A and the 120 meter attribute value of point B (i.e., (100−80)/(120−80)=½). Alternatively, interpolation along the straight-line distance between point A and point B in the point cloud can be performed. The interpolated data point number four (4) lies on a feature (an iso-line in this case) corresponding to a 100 meter elevation contour.

As the entire set of sorted points are traversed along the Hilbert curve, all of the interpolated data points numbers one (1) to twenty (22) that are generated lie on the 100 meter elevation contour. When more than one feature criterion has been specified, method 600 may loop back in an iterative manner to block 650 via block 670 to consider the next feature criterion. In this manner, multiple features can be found which may correspond to other attributes (e.g., other elevations, temperature, or intensity).

As discussed previously herein, the output data points (e.g., interpolated data points), which represent the feature, may be output in a point cloud format where each point is represented by a set of coordinates and an attribute value (e.g., the 100 meter boundary value). Alternatively, as discussed previously herein, the output data points may be converted to a vector format where each point is represented by a vector vertex and an attribute value. The output data points may be output by writing to the data cache 190, for example, or sending to a rendering logic (not shown) via read/write logic 130, in accordance with one embodiment.

In this manner, the method 600 of FIG. 6 may be implemented on feature logic 110 of the database system 100 of FIG. 1 to find features within point clouds, in accordance with one embodiment. The method 600 is able to accommodate point clouds that are within different types of multi-dimensional spaces including two-dimensional spaces, three-dimensional spaces, four-dimensional spaces, etc. However, some practical limit may exist on the number of dimensions of a multi-dimensional space that can currently be accommodated, as limited by current technology.

Figure 7:
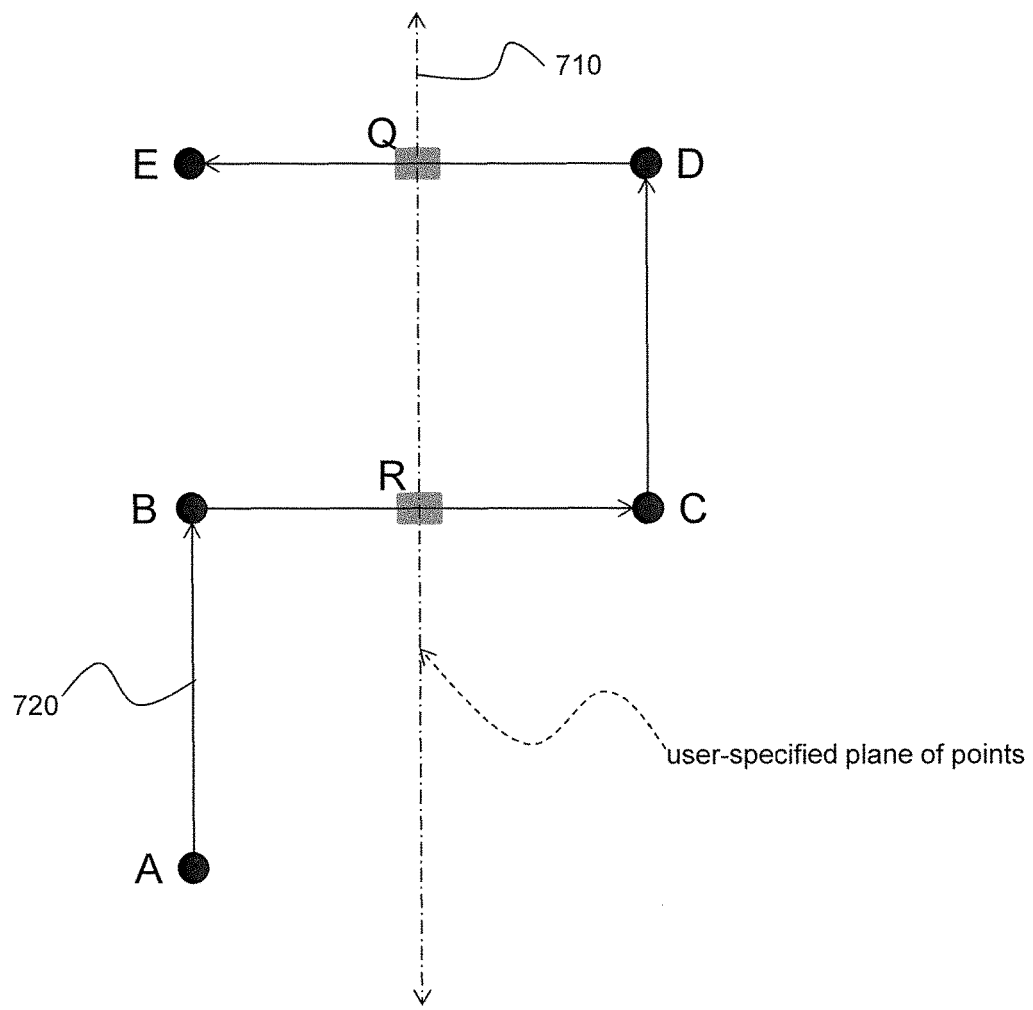
FIG. 7 illustrates an example embodiment of identifying a planar cross-section through a point cloud using the database system of FIG. 1 and the method of FIG. 6.

In addition to identifying iso-lines and iso-surfaces within point clouds, the database system 100 of FIG. 1 is also configured to identify other types of features as well including planar cross-sections and intersections. The output data points, representing a feature, may or may not be derived via interpolation, depending on the particular use case scenario. FIG. 7 illustrates an example embodiment of identifying a planar cross-section through a point cloud using the database system 100 of FIG. 1 and the method 600 of FIG. 6. In the example of FIG. 7, the feature criterion is the condition of crossing a user-specified plane, specified within a multi-dimensional space, when traversing the multi-dimensional space along a space-filling curve.

A user-specified plane of points is specified in a multi-dimensional space (e.g., a three-dimensional space), as part of specifying the feature criterion (e.g., in step 610 of FIG. 6), such that the user-specified plane of points cuts through a point cloud in the multi-dimensional space. In one embodiment, specification of the user-specified plane of points is controlled via visual user interface logic 120 of feature logic 110 of FIG. 1. In accordance with one embodiment, the user-specified plane of points effectively becomes part of the point cloud data (e.g., which is read at step 620 of FIG. 6). However, the distinction between point cloud points and user-specified plane points is maintained (e.g., via identifiers). The effective intersection of the point cloud and the user-specified plane represents a planar cross-section of the point cloud. In FIG. 7, for practical reasons, only two points Q and R of a user-specified plane of points 710 are shown (e.g., in Hilbert-sorted space) after transformation and sorting (e.g., in steps 630 and 640 of FIG. 6) with respect to only a small subset of point cloud points A, B, C, D, and E on a space-filling curve 720.

In the example of FIG. 7, as the sorted points are being traversed along the space-filling curve 720 (e.g., in step 650 of FIG. 6) from A to E, the user-specified plane 710 is crossed twice, first when traversing from point B to point C and second when traversing from point D to point E in the sorted order. In one embodiment, the attribute values corresponding to points B and C may be used to linearly interpolate between points B and C to derive an interpolated output data point (e.g., at step 660 of FIG. 6). Similarly, the attribute values corresponding to points D and E may be used to linearly interpolate between points D and E to derive another interpolated output data point (e.g., at step 660 of FIG. 6). As part of deriving the interpolated output data points, the interpolated output data points may also be converted back to the original multi-dimensional space (e.g., at step 660 of FIG. 6).

For example, in accordance with one embodiment, the locations of the interpolated output data points correspond to the locations of points Q and R on the user-specified plane of points. However, the attribute values of the interpolated output data points are derived from the attribute values of the sorted points on the space-filling curve via an interpolation process (e.g., at step 660 of FIG. 6). For example, point B may have an elevation attribute value of 510 meters and point C may have an elevation attribute value of 550 meters. The interpolated output data point is assigned a position at the location of point R and the elevation attribute value of the interpolated output data point is determined, via linear interpolation, to be (550−510)/2+510=530 meters (e.g., at step 660 of FIG. 6). The calculation assumes that point R is half way between point B and point C. However, a more complex linear interpolation could be performed, in accordance with one embodiment, which takes into account the actual distances between points B and R and points R and C. As the entire space-filling curve is traversed, other interpolated output data points are formed as well, making up the entire planar cross-section through the point cloud. Again, the interpolated output data points may be transformed back to the original multi-dimensional space, in accordance with one embodiment (e.g., at step 660 of FIG. 6).

In this way, the interpolated output data points represent points of a planar cross-section through the point cloud. The planar cross-section is not a feature in the iso-feature sense where every point in the planar cross-section has the same attribute value. Instead, the planar cross-section is a feature where all the points in the planar cross-section lie in a same plane but can have different attribute values.

In another embodiment, instead of performing interpolation between two points based on attribute values, the user-specified plane of points can simply be assigned an attribute value of a point in the point cloud (e.g., at step 660 of FIG. 6). For example, point R can be assigned the attribute value of point B (or point C) when the feature criterion is met (i.e., when the user-specified plane of points is crossed). Similarly, point Q can be assigned the attribute value of point D (or point E) when the feature criterion is met. In such an embodiment, the output data points would have the locations (coordinates) of, for example, points Q and R with the assigned attribute values.

In another alternative embodiment, instead of deriving output data points of a planar cross-section via interpolation or assignment, the points Q and R in the user-specified plane of points can simply be designated as being output data points that meet the feature criteria (e.g., at step 660 of FIG. 6). In such an embodiment, the attributes of any two (2) points (e.g., of points B and C) don't have to be considered. In this way, the resultant feature is simply a set of output data points that represent the planar cross-section through the point cloud. Such an alternative embodiment may be useful when the attribute values are of no concern.

FIG. 8 illustrates an example embodiment of identifying the intersection of two point clouds using the database system 100 of FIG. 1 and the method 600 of FIG. 6. The two point clouds exist in the same multi-dimensional space and certain points from the first point cloud may be at the same (or nearly the same) locations within the multi-dimensional space as certain points from the second point cloud (i.e., the two point clouds may intersect at certain locations). Therefore, one feature criterion that can be specified (e.g., at step 610 of FIG. 6) is the condition where a point in the first point cloud and a point in the second point cloud are found to be within a specified distance of each other when traversing a multi-dimensional space along a space-filling curve. Another feature criterion that can be specified (e.g., at step 610 of FIG. 6) is the condition where a point in the second point cloud is simply found to be between two points in the first point cloud when traversing the multi-dimensional space along the space-filling curve.

FIG. 8 illustrates a small subset of points from two point clouds. In one embodiment, point cloud data of the two point clouds was read into the system 100 of FIG. 1 (e.g., at step 620 of FIG. 6). Two points A and B from the first point cloud have been transformed and sorted (e.g., at steps 630 and 640 of FIG. 6) to represent space-filling distance values along a space-filling curve. A single point α from the second point cloud has been transformed and sorted (e.g., at steps 630 and 640 of FIG. 6) to represent a space-filling distance value along the same space-filling curve. As the sorted points (along the space-filling curve) are being traversed (e.g., at step 650 of FIG. 6), the sorted points A, α, and B are encountered in sorted order. In one embodiment, the system 100 detects that the points A and B are from the first point cloud and the point α is from the second point cloud via point cloud identifiers associated with the points (i.e., there is a point α from the second point cloud that lies along the space-filling curve between the points A and B which are from the first point cloud). In accordance with one embodiment, there is one Hilbert-sorted point list for each point cloud. The points from the two point clouds are not mixed into one single list. However, they could be mixed, in accordance with another embodiment. In one embodiment, a feature criterion may be met (e.g., at step 660 of FIG. 6) simply by determining that point α is between points A and B (i.e., an intersection of the two point clouds has occurred).

In another embodiment, the system 100 determines that a feature criterion is met (e.g., at step 660 of FIG. 6) by determining that points A and α are within a specified distance Δ of each other in Hilbert space (i.e., an intersection of the two point clouds has occurred). The distance Δ may be specified in the original multi-dimensional space and converted to Hilbert space. Alternatively, the distance Δ may be specified directly in Hilbert space. The distance Δ may be specified as part of the feature criterion (at step 610 of FIG. 6), in accordance with one embodiment. Therefore, points A and α constitute an instance of intersection of the two point clouds. The first point cloud and the second point cloud may be associated with the same or different attributes. For example, points A and α may be associated with different attributes. For example, the points A and B may be associated with elevation attribute values and the point α may be associated with a temperature attribute value. In one embodiment, a Hilbert-sorted point cloud can have multiple attributes. Attributes, if any, that are used to find features can be chosen after the sorting is accomplished (e.g., at step 640 of FIG. 6).

In one embodiment, where the two point clouds are associated with different attributes (e.g., elevation and temperature), the system may form a location of an interpolated output data point based on one of the attribute types (e.g., the elevation values) of points A and B using linear interpolation (either in Hilbert space or multi-dimensional space), as discussed previously herein (e.g., at step 660 of FIG. 6). The system may also assign the other attribute value (e.g., the temperature value) associated with the point α to the interpolated output data point (e.g., at step 660 of FIG. 6). The resultant interpolated output data point represents an instance of intersection of the two point clouds. As the entire space-filling curve is traversed, other interpolated output data points are formed as well (e.g., at step 660 of FIG. 6), making up the entire intersection of the two point clouds. Other ways of representing the intersection of two point clouds as an interpolated output data point are possible as well, in accordance with other embodiments. Again, the interpolated output data points may be converted back to the original multi-dimensional space of the point cloud (e.g., at step 660 of FIG. 6).

In accordance with another embodiment, instead of performing interpolation, characteristics of both points A and α (or B and α) can be designated as representing an intersection of the two point clouds. For example, if the point α of the second point cloud is determined to lie between the current point A and the next point B in the first point cloud, then an intersection of the two point clouds can be assumed to occur, for example, at the location of the current point A (or point B). The derived output data point (e.g., derived at step 660 of FIG. 6) has the location of the current point A (or point B) and has the attribute values of points A and α (or B and α). In this manner, a distance A does not have to be specified and taken into account. Other ways of representing the intersection of two point clouds, as output data points that are not based on interpolation, are possible as well.

In this way, the output data points represent an intersection of two point clouds (i.e., where points in the two point clouds are very close to each other). The intersection is not a feature in the iso-feature sense that every point in the intersection has the same attribute value. Instead, the intersection is a feature representing certain points in one point cloud that are very close to certain points in the other point cloud. However, the resulting output data points making up the intersection can have different attribute types or no attribute type (resulting in merging or dropping attributes).

Computing Device Embodiment

Figure 9:
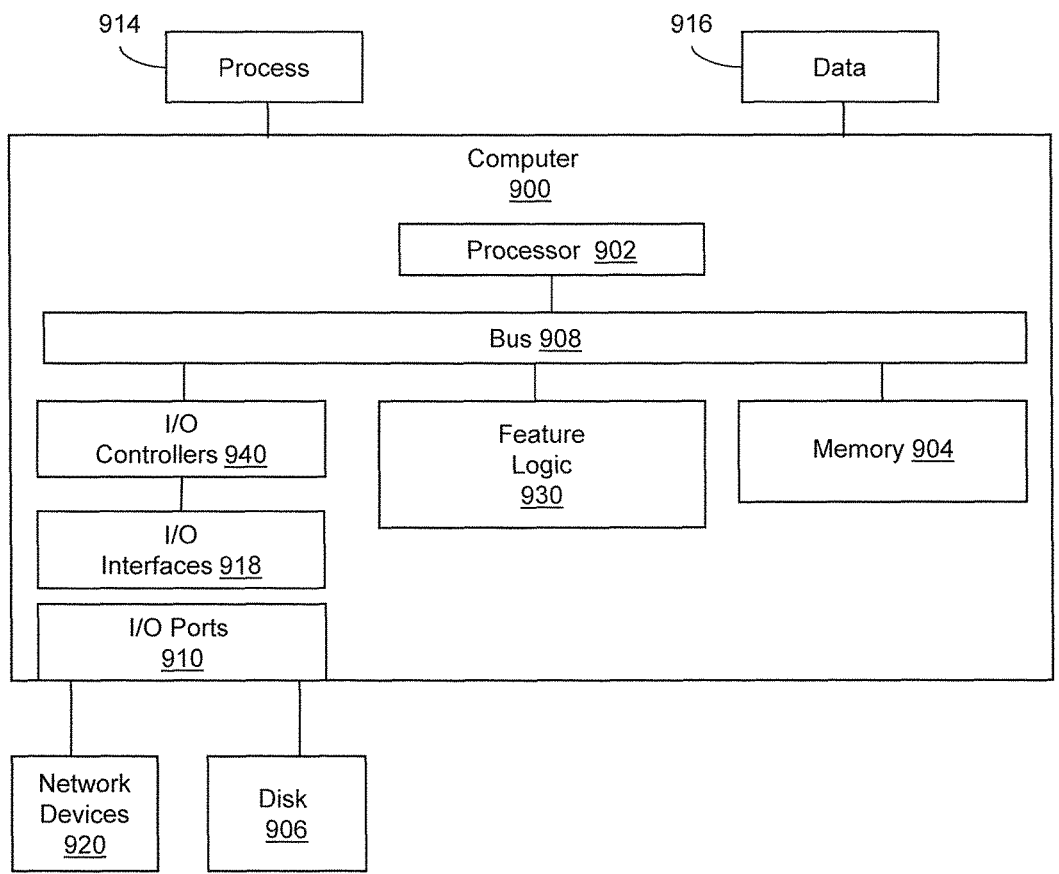
FIG. 9 illustrates one embodiment of a computing device upon which the feature logic of a computing system (e.g., a database system) may be implemented.

FIG. 9 illustrates an example computing device that is configured and/or programmed with one or more of the example systems and methods described herein, and/or equivalents. FIG. 9 illustrates one embodiment of a computing device upon which feature logic of a computing system (e.g., a database system) may be implemented. The example computing device may be a computer 900 that includes a processor 902, a memory 904, and input/output ports 910 operably connected by a bus 908.

In one example, the computer 900 may include feature logic 930 (corresponding to feature logic 110 from FIG. 1) which is configured to identify features within point cloud data. In different examples, logic 930 may be implemented in hardware, a non-transitory computer-readable medium with stored instructions, firmware, and/or combinations thereof. While the logic 930 is illustrated as a hardware component attached to the bus 908, it is to be appreciated that in other embodiments, logic 930 could be implemented in the processor 902, a module stored in memory 904, or a module stored in disk 906.

In one embodiment, logic 930 or the computer 900 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the performing of identifying features within point cloud data. The means may also be implemented as stored computer executable instructions that are presented to computer 900 as data 916 that are temporarily stored in memory 904 and then executed by processor 902.

Logic 930 may also provide means (e.g., hardware, non-transitory computer-readable medium that stores executable instructions, firmware) to identify features within point cloud data at least in part by converting a set of coordinates of each point of the point cloud data into a space-filling distance value representing a distance along a single dimensional space-filling curve (e.g., a Hilbert curve).

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

Systems, methods, and other embodiments have been described that are configured to identify features within point cloud data. In one embodiment, a data cache is configured to store records of point cloud data. A record of point cloud data represents multiple points of at least one point cloud in a multi-dimensional space. Each point is defined by an attribute value quantifying an attribute of the point and a set of coordinates specifying a location of the point in the multi-dimensional space. Read/write logic is configured to read records of the point cloud data from the data cache. Transforming logic is configured to transform the set of coordinates for each point into a space-filling distance value representing a distance along a single dimensional space-filling curve. Sorting logic is configured to sort the points according to the space-filling distance values to generate a sorted order of points. Analysis logic is configured to traverse the points in sorted order and derive output data points, while traversing, based on a specified feature criterion. The output data points define at least one feature within the at least one point cloud.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by at least a processor for executing instructions from a memory, the method comprising:
    specifying, via at least the processor, at least one feature criterion;
    reading point cloud data of at least one point cloud from at least one data structure via at least the processor, wherein the point cloud data represents a plurality of points of the at least one point cloud in a multi-dimensional space, and wherein each point of the plurality of points is defined by:
        at least one attribute value of an attribute of the point, and
        a set of coordinates in the multi-dimensional space for the point;
    transforming, via at least the processor, the set of coordinates for each point of the plurality of points into a space-filling distance value representing a distance along a single dimensional space-filling curve;
    sorting, via at least the processor, the plurality of points according to the space-filling distance value of each point of the plurality of points to generate a sorted order of the plurality of points;
    traversing the plurality of points in the sorted order via at least the processor; and
    deriving output data points during the traversing based on the at least one feature criterion, wherein the output data points identify at least one feature within the at least one point cloud.

2. The method of claim 1, further comprising outputting, via at least the processor, the output data points in a point cloud format.

3. The method of claim 1, further comprising transforming, via at least the processor, the output data points into a vector format.

4. The method of claim 1, wherein the at least one feature represents an iso-line through the at least one point cloud, and wherein the at least one feature criterion is a condition of crossing a specified attribute boundary value when traversing the plurality of points in the sorted order.

5. The method of claim 1, wherein the at least one feature represents an iso-surface through the at least one point cloud, and wherein the at least one feature criterion is a condition of crossing a specified attribute boundary value when traversing the plurality of points in the sorted order.

6. The method of claim 1, wherein the at least one feature represents a planar cross-section through the at least one point cloud, and wherein the at least one feature criterion is a condition of crossing a user-specified plane of points specified within the multi-dimensional space.

7. The method of claim 1, wherein the at least one feature represents an intersection of a first point cloud and a second point cloud of the at least one point cloud represented in the multi-dimensional space.

8. The method of claim 1, further comprising controlling user specification of the at least one feature criterion via a graphical user interface or an application program interface.

9. The method of claim 1, wherein the single dimensional space-filling curve is a Hilbert curve.

10. The method of claim 1, wherein the attribute includes one of intensity, elevation, color, density, temperature, return number, or number-of-occurrences.

11. A database system, comprising:
    a processor;
    a data cache configured to store at least one record of point cloud data, wherein the at least one record of point cloud data represents a plurality of points of at least one point cloud in a multi-dimensional space, and wherein each point of the plurality of points is defined by:
- at least one attribute value of an attribute of the point, and
- a set of coordinates in the multi-dimensional space for the point;

a read/write module stored in a non-transitory computer-readable medium including instructions that when executed cause the processor to read the at least one record of the point cloud data from the data cache;

a transforming module stored in the non-transitory computer-readable medium including instructions that when executed cause the processor to transform the set of coordinates for each point of the plurality of points into a space-filling distance value representing a distance along a single dimensional space-filling curve, wherein the single dimensional space-filling curve is a Hilbert curve;

a sorting module stored in the non-transitory computer-readable medium including instructions that when executed cause the processor to sort the plurality of points according to the space-filling distance value of each point of the plurality of points to generate a sorted order of the plurality of points;

an analysis module stored in the non-transitory computer-readable medium including instructions that when executed cause the processor to perform:
- traversing of the plurality of points in the sorted order, and
- deriving of output data points during the traversing based on at least one specified feature criterion, wherein the output data points identify at least one feature within the at least one point cloud.

12. The database system of claim 11, further comprising a vectorization module stored in the non-transitory computer-readable medium including instructions that when executed cause the processor to transform the output data points into a vector format.

13. The database system of claim 11, wherein the read/write module stored in the non-transitory computer-readable medium further includes instructions that when executed cause the processor to write the output data points to the data cache.

14. The database system of claim 11, wherein the attribute includes one of intensity, elevation, color, density, temperature, return number, or number-of-occurrences.

15. The database system of claim 11, further comprising a visual user interface module stored in the non-transitory computer-readable medium including instructions that when executed cause the processor to provide a graphical user interface that controls user specification of the at least one specified feature criterion.

16. The database system of claim 15, further comprising a display screen configured to display and facilitate user interaction with at least the graphical user interface provided by the visual user interface module.

17. A non-transitory computer-readable medium storing instructions that, when executed by one or more processors of a computing device, cause the computing device to at least:
- control a reading of point cloud data of at least one point cloud from at least one data structure via the one or more processors, wherein the point cloud data represents a plurality of points of the at least one point cloud in a multi-dimensional space, and wherein each point of the plurality of points is defined by:
  - at least one attribute value of an attribute of the point, wherein the attribute includes one of intensity, elevation, color, density, temperature, return number, or number-of-occurrences; and
  - a set of coordinates in the multi-dimensional space for the point;
- control a transforming of, via the one or more processors, the set of coordinates for each point of the plurality of points into a space-filling distance value representing a distance along a single dimensional space-filling curve;
- control a sorting of, via the one or more processors, the plurality of points according to the space-filling distance value of each point of the plurality of points to generate a sorted order of the plurality of points;
- control a traversing of, via the one or more processors, the plurality of points in the sorted order; and
- generating, via the one or more processors, output data points during the traversing based on at least one specified feature criterion, wherein the output data points identify at least one feature within the at least one point cloud.

18. The non-transitory computer-readable medium of claim 17, wherein the instructions further comprise instructions that, when executed by the one or more processors, cause the computing device to at least control user specification of the at least one specified feature criterion via a graphical user interface or an application program interface.

19. The non-transitory computer-readable medium of claim 17:
wherein the single dimensional space-filling curve is a Hilbert curve.

* * * * *

UNITED STATES PATENT AND TRADEMARK OFFICE
CERTIFICATE OF CORRECTION

PATENT NO. : 10,372,728 B2
APPLICATION NO. : 15/267275
DATED : August 6, 2019
INVENTOR(S) : Horhammer et al.

Page 1 of 1

It is certified that error appears in the above-identified patent and that said Letters Patent is hereby corrected as shown below:

On the Title Page

Column 2, Item (74) under Attorney Agent, or Firm, Line 1, delete "Grouo," and insert -- Group, --, therefor.

In the Specification

In Column 1, Line 31, delete "wikifTriangulated" and insert -- wiki/Triangulated --, therefor.

In Column 14, Line 55, delete "A" and insert -- Δ --, therefor.

In Column 14, Line 56, delete "A" and insert -- Δ --, therefor.

In Column 14, Line 58, delete "A" and insert -- Δ --, therefor.

In Column 14, Line 59, delete "A" and insert -- Δ --, therefor.

In Column 15, Line 38, delete "A" and insert -- Δ --, therefor.

Signed and Sealed this
Fourth Day of August, 2020

Andrei Iancu
*Director of the United States Patent and Trademark Office*